US006359781B1

(12) United States Patent
Hoss et al.

(10) Patent No.: US 6,359,781 B1
(45) Date of Patent: Mar. 19, 2002

(54) APPARATUS FOR COOLING HEAT GENERATING DEVICES

(75) Inventors: Shawn P. Hoss; Brently L. Cooper, both of Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 09/557,894

(22) Filed: Apr. 21, 2000

(51) Int. Cl.$^7$ ................................................ H05K 7/20
(52) U.S. Cl. .................... 361/687; 361/692; 361/695; 361/720; 165/121; 165/104.33; 174/52.1; 257/719
(58) Field of Search .................. 361/683, 692–697, 361/685–688, 689, 717–724, 756, 775; 257/706–727; 165/80.3, 121–126, 104.33, 104.34, 185; 454/184; 307/112, 125, 116, 117, 139; 388/939; 312/107, 111, 257.1, 236, 323.3; 415/177, 178; 174/16.03, 52.01

(56) References Cited

U.S. PATENT DOCUMENTS

| | | | |
|---|---|---|---|
| 3,864,607 A | | 2/1975 | Phillips |
| 4,296,455 A | | 10/1981 | Leaycraft et al. |
| 4,408,220 A | | 10/1983 | Calabro |
| 4,674,004 A | | 6/1987 | Smith et al. |
| 4,851,965 A | | 7/1989 | Gabuzda et al. |
| 4,888,637 A | | 12/1989 | Sway-Tin et al. |
| 5,387,815 A | * | 2/1995 | Nishiguchi .................. 257/704 |
| 5,390,078 A | * | 2/1995 | Taylor ......................... 361/721 |
| 5,546,272 A | | 8/1996 | Moss et al. |
| 5,572,403 A | | 11/1996 | Mills |
| 5,597,035 A | | 1/1997 | Smith et al. |
| 5,673,176 A | | 9/1997 | Penniman et al. |
| 5,828,549 A | | 10/1998 | Gandre et al. |
| 5,829,515 A | | 11/1998 | Jeffries et al. |
| 5,912,802 A | | 6/1999 | Nelson |
| 6,009,938 A | | 1/2000 | Smith et al. |
| 6,061,237 A | * | 5/2000 | Sands et al. ................. 361/695 |
| 6,134,108 A | * | 10/2000 | Patel et al. .................. 361/695 |
| 6,180,874 B1 | * | 1/2001 | Brezina et al. ............. 174/16.3 |

FOREIGN PATENT DOCUMENTS

JP       2000133976 A  *  5/2000  ............. G06F/1/20

* cited by examiner

Primary Examiner—Leo P. Picard
Assistant Examiner—Michael Datskovsky
(74) Attorney, Agent, or Firm—Haynes and Boone, LLP

(57) ABSTRACT

A computer system including a chassis having a printed circuit substrate mounted thereon. A plurality of microprocessors are mounted on the printed circuit substrate. A first one of the microprocessors is mounted in an in-line configuration with respect to a second one of the microprocessors. A heat dissipating device is mounted on each one of the microprocessors. The heat dissipating device mounted on the first one of the microprocessors includes a first heat dissipating body positioned at a first elevation above a mounting surface of the printed circuit substrate. The heat dissipating device mounted on the second one of the microprocessors includes a second heat dissipating body positioned at a second elevation above the mounting surface of the printed circuit substrate. A fan is mounted on the chassis adjacent to the printed circuit substrate for directing a stream of air over at least a portion of the first and the second heat dissipating bodies. Each heat dissipating body is subjected to a substantially unheated stream of air, improving cooling efficiency.

19 Claims, 3 Drawing Sheets

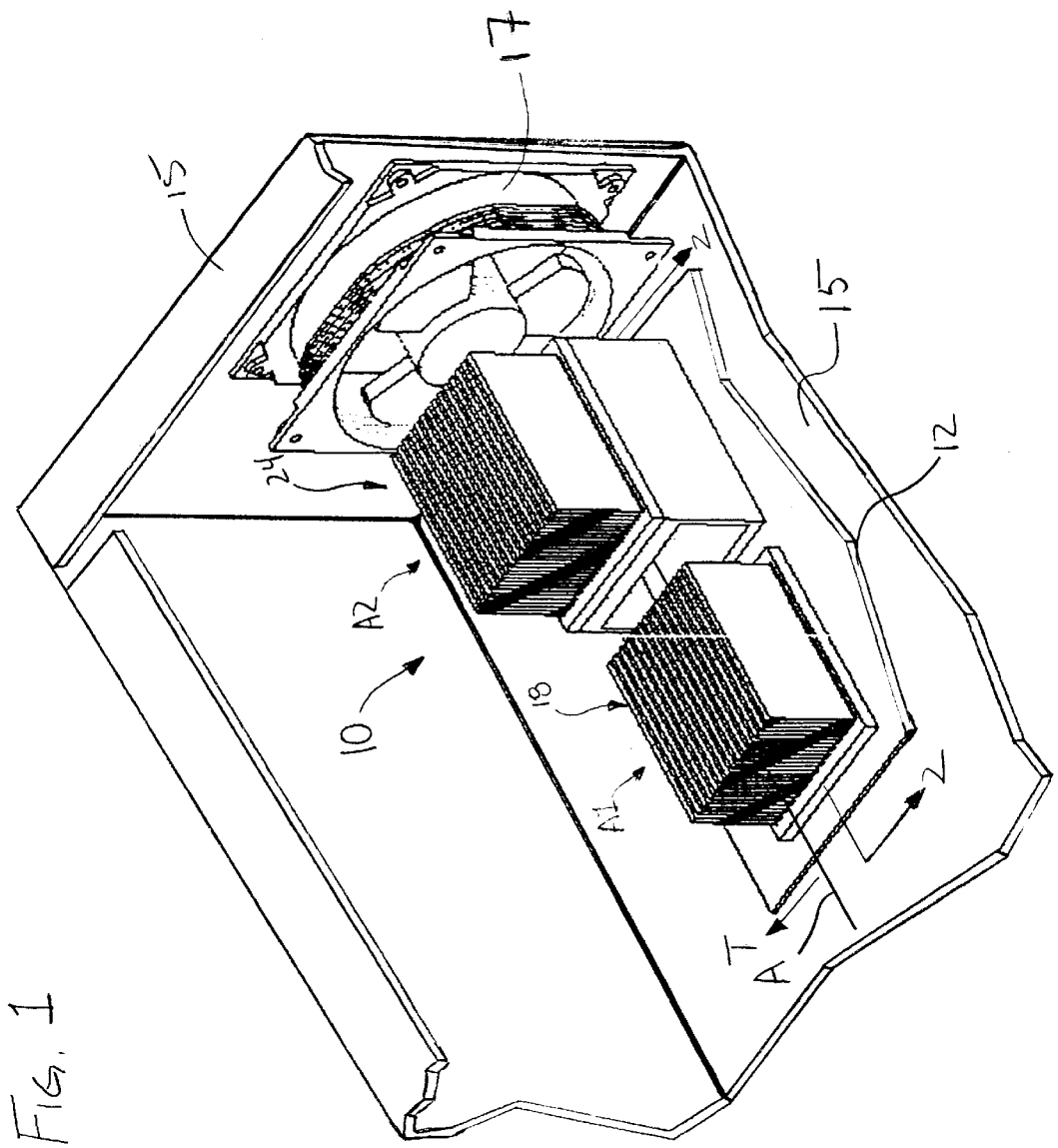

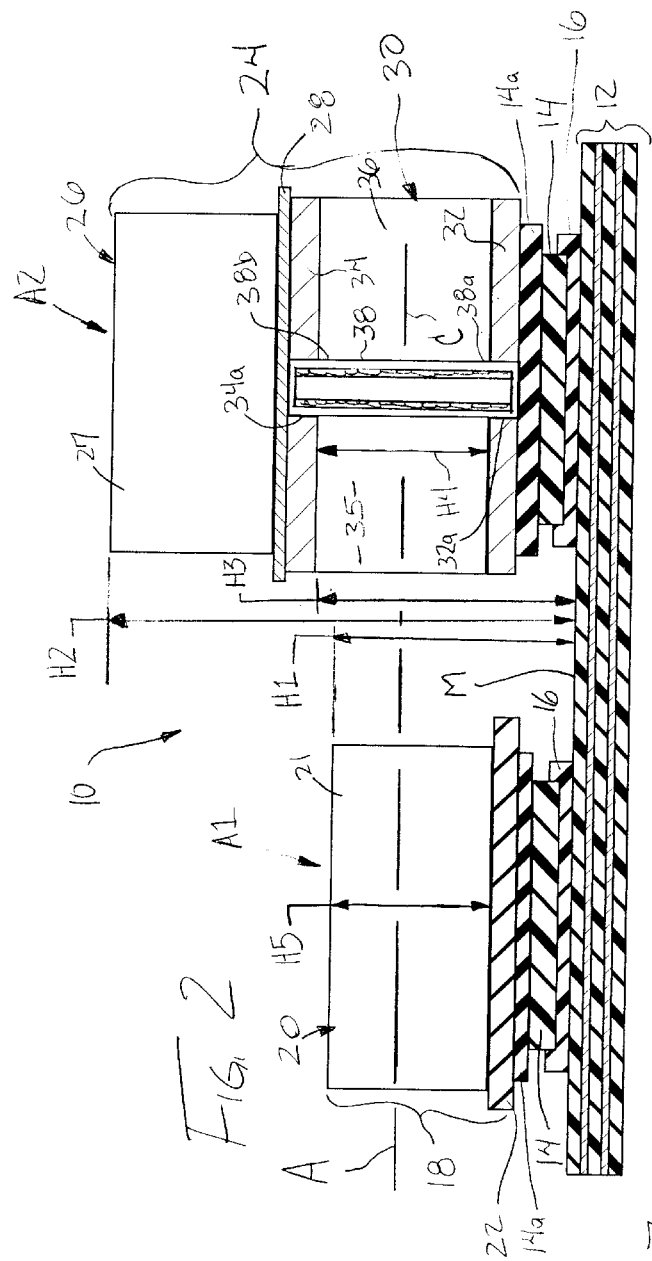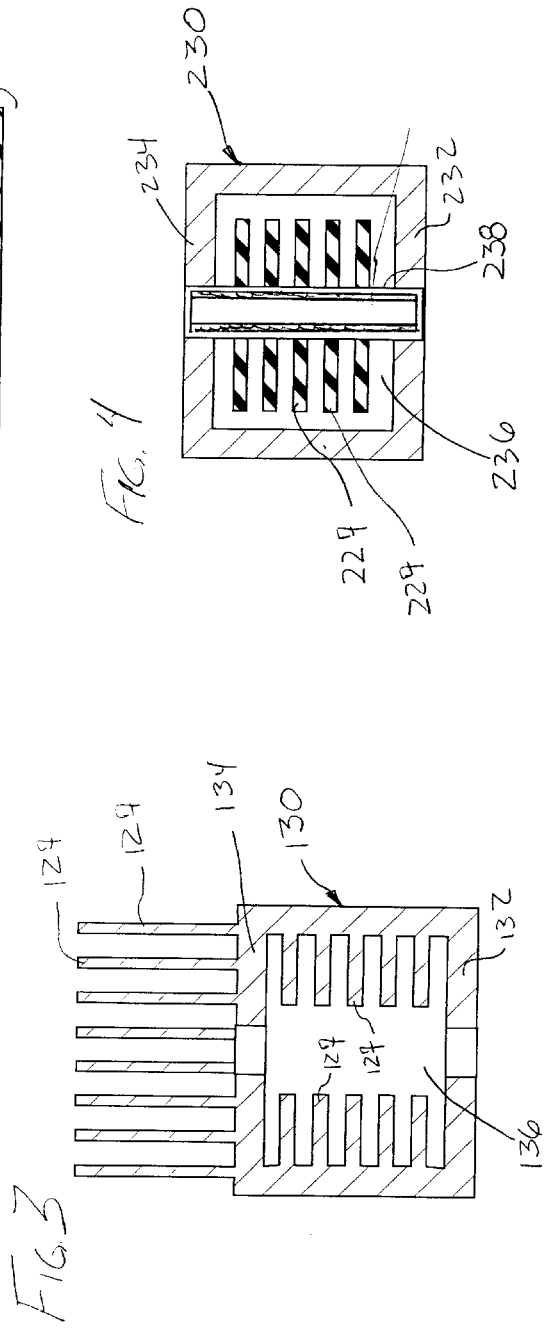

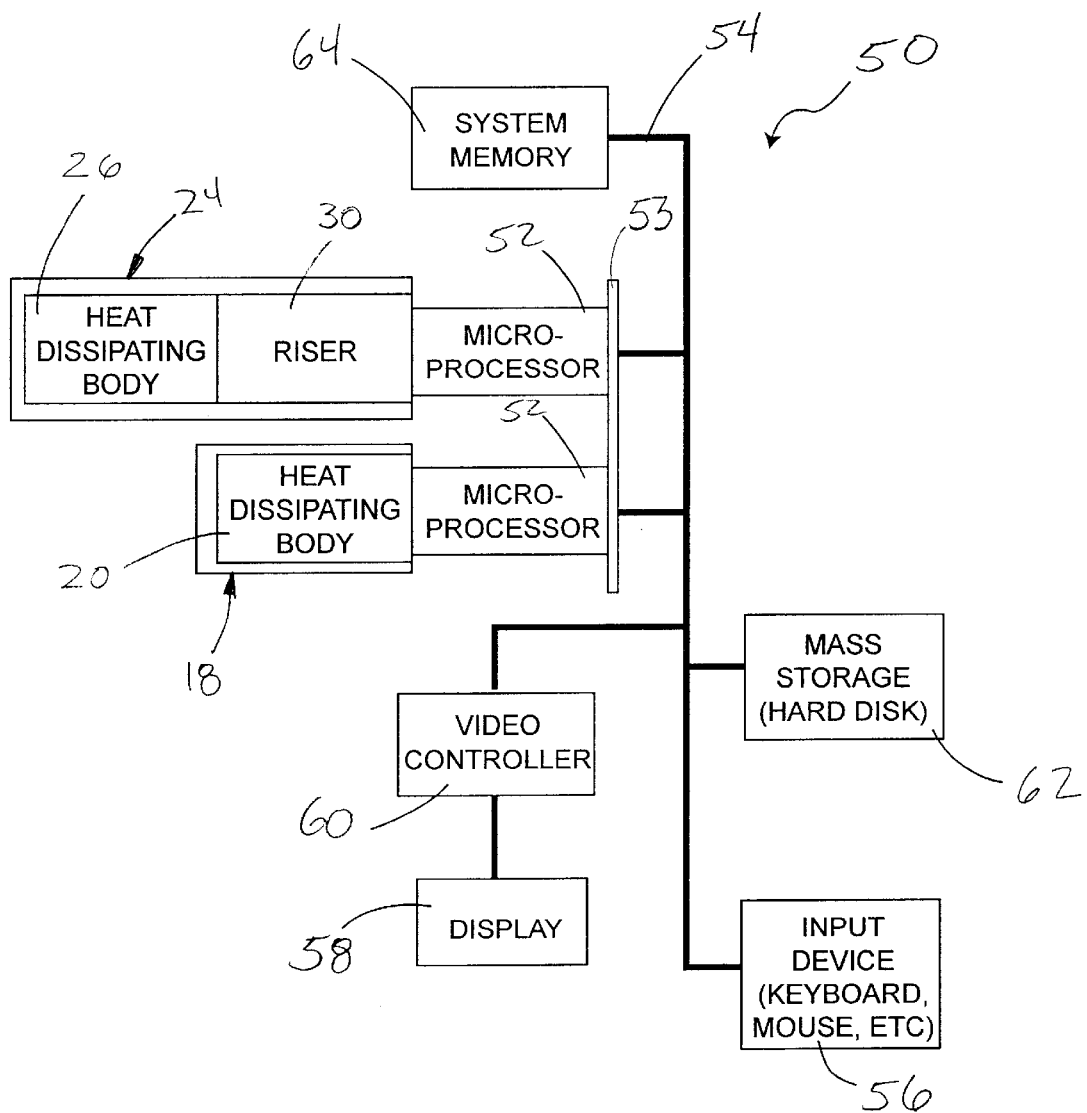

APPARATUS FOR COOLING HEAT GENERATING DEVICES

BACKGROUND

The disclosures herein relate generally to apparatus for cooling heat generating devices. More particularly, the disclosures herein relate to apparatus for cooling heat generating devices in computers.

Some processor configurations utilize a pin and socket type mounting technique for mounting the processor on a printed circuit substrate. This type of mounting technique tends to use a lot of space on the printed circuit substrate. Space constraints combined with signal bus routing requirements dictate certain processor configurations in a 4-processor computer such as a server. The space constraints are particularly stringent in a multiple-processor computer having a small form factor.

Several conventional configurations meet the space and signal routing requirements. However, in these conventional configurations at least two of the processors and associated heat sinks are in-line with each other with respect to an air flow axis of an adjacent cooling fan. Furthermore, in conventional in-line configurations, the heat sinks associated with each processor are at approximately the same elevation with respect to a mounting surface of the printed circuit substrate.

U.S. Pat. No. 5,912,802 discloses a device and a method for cooling an integrated circuit package, such as a microprocessor, within an enclosure of a computer. The device includes a blower, a first heat sink attached to the microprocessor, and a first air duct coupling the blower to the first heat sink. The blower has an air intake for inducting ambient air from outside of the enclosure. The blower generates an air stream which flows through the first air duct to the first heat sink for cooling the microprocessor. A second air duct connected to the first heat sink may be used to subsequently direct the air stream to a second heat sink for cooling a second microprocessor. However, the cooling of the first microprocessor increases the temperature of the air stream, reducing the effective heat transfer at the second microprocessor.

U.S. Pat. No. 5,828,549 discloses a method and an apparatus for dissipating heat from an electrical device and for routing air from one place to another. In a computer having several heat generating devices, a heat sink is thermally attached to each one of the devices. Each of the heat sinks has a base, two side walls and a top wall forming a passage therebetween. The base, side and top walls are all thermally conductive to the corresponding heat producing device, and therefore each of them radiate heat into the passage. Each of the heat sinks also includes several cooling fins that extend into the passage, thereby increasing the thermal efficiency of the heat sink. Furthermore, the passage is of sufficient size to allow multiple heat sinks to be serially in-line, thereby allowing an air mass to flow from one heat sink to another.

In a conventional in-line configuration, an upstream heat sink is subjected to a cooler air stream than a downstream heat sink. The heat dissipated from the upstream heat sink substantially heats the air stream. The heating of the air stream by the upstream processor dramatically reduces the amount of heat transfer from the downstream heat sink to the air stream. The reduction in heat transfer at the downstream heat sink can result in the downstream processor becoming overheated.

The heat transfer efficiency of the downstream heat sink in conventional in-line configurations can be improved using a forced air device, such as a very large fan or a blower, capable of delivering air flow at high pressures and volumes. These forced air devices are large, taking up a significant amount of space. Because of the inherent air flow limitations and heating of the air associated with heat sinks in conventional in-line configurations, the use of a large cooling fan to compensate for poor cooling efficiency provides negligible cooling reserves.

Another conventional technique for enhancing the cooling efficiency of the downstream heat sink in a conventional in-line processor configuration includes using an air duct to direct some of the cool air directed from the fan to the downstream heat sink. The air duct typically also includes a portion for directing the exhaust air from the upstream heat sink away from the inlet to the downstream heat sink. This technique requires the upstream and downstream heat sinks to have a considerable amount of physical separation in order to provide room for the air duct. This physical separation takes up additional space in an already constrained area.

Accordingly, what is needed is an apparatus that economically and efficiently transfers heat from a plurality of in-line heat sinks and that occupies a reduced amount of space.

SUMMARY

One embodiment, accordingly, provides a cooling apparatus that positions in-line heat dissipating bodies at different elevations with respect to a reference surface to enhance the transfer of heat from each one of the heat dissipating bodies to a stream of air. To this end, an apparatus for cooling a plurality of heat generating devices includes a support member and a plurality of heat dissipating devices attached to the support member. A first one of the heat dissipating devices includes a first heat dissipating body positioned at a first elevation above a mounting surface of the support member. A second one of the heat dissipating devices includes a second heat dissipating body positioned at a second elevation above the mounting surface of the support member.

A principal advantage of this embodiment is that each heat dissipating body is subjected to a substantially unheated stream of air, improving cooling efficiency.

BRIEF DESCRIPTION OF THE DRAWING FIGURES

FIG. 1 is a perspective view illustrating an embodiment of an apparatus for cooling heat generating devices in an electronic device.

FIG. 2 is a cross sectional view taken along the line 2—2 in FIG. 1.

FIG. 3 is a cross sectional view illustrating an embodiment of a riser with integral cooling fins.

FIG. 4 is a cross sectional view illustrating an embodiment of a heat routing member having cooling fins thereon mounted in the air flow passage of a riser.

FIG. 5 is a block diagram view illustrating an embodiment of an efficiently cooled computer system.

DETAILED DESCRIPTION

An embodiment of an apparatus 10 for cooling a plurality of heat generating devices 14 is illustrated in FIGS. 1 and 2. The apparatus 10 includes a support member 12, such as a printed circuit substrate, having the heat generating devices 14 mounted thereon, FIG. 2. Microprocessors, system memory and video controllers represent examples of the heat generating devices 14. The support member 12 is mounted on a chassis 15, FIG. 1. A forced air device, such as a fan 17, is mounted on the chassis 15 adjacent to the heat generating devices 14. Each one of the heat generating devices 14 is mounted on a corresponding socket 16, FIG. 2. Each socket 16 is mounted on the support member 12. Each one of the heat generating devices 14 include a heat diffusing member 14a attached thereto.

The heat generating devices 14 are mounted in a substantially in-line configuration with respect to a reference axis A. An in-line configuration, FIGS. 1 and 2, is defined herein to mean that the reference axis A is aligned with at least a portion of each one of the heat generating devices 14. Depending on the application, the heat generating devices 14 may be centered with respect to the reference axis A or offset in a transverse direction T, FIG. 1, with respect to the reference axis A. A first one of the heat generating devices 14 is mounted in a first axial position A1 with respect to the reference axis A. A second one of the heat generating devices 14 is mounted in a second axial position A2 with respect to the reference axis A.

Still referring to FIGS. 1 and 2, a first heat dissipating device 18 is mounted on the heat generating device 14 in the first axial position A1. The first heat dissipating device 18 is engaged with the heat diffusing member 14a of the corresponding heat generating device 14, FIG. 2. The first heat dissipating device 18 includes a first heat dissipating body 20, such as a heat sink, including a plurality of cooling fins 21 and a heat spreading plate 22 attached thereto. The heat spreading plate 22 conducts heat from the corresponding heat generating device 14 to the cooling fins 21. The first heat dissipating body 20 is positioned at a first elevation H1 above a mounting surface M of the support member 12.

A second heat dissipating device 24, FIG. 2, is mounted on the heat generating device 14 in the second axial position A2. The second heat dissipating device 24 includes a second heat dissipating body 26, such as a heat sink, including a plurality of cooling fins 27, a heat spreading plate 28 attached to the heat dissipating body 24 and a thermally conductive riser 30 mounted between the heat spreading plate 28 and the heat diffusing member 14a of the corresponding heat generating device 14. The heat spreading plate 28 conducts heat from the riser 30 to the cooling fins 27. The second heat dissipating body 26 is positioned at a second elevation H2 above the mounting surface M of the support member 12.

In the embodiment illustrated in FIG. 2, the riser 30 has a generally block shaped body including a first heat spreading member 32, a second heat spreading member 34 spaced apart from the first heat spreading member 32 and a passage 36 extending therebetween. One or more side walls 35 extend between the first and the second heat spreading members 32, 34. The riser 30 is preferably made from a conductive material such as aluminum or copper using a known technique such as machining, extrusion, or molding.

A centerline axis C, FIG. 2, of the passage 36 extends in a generally parallel direction to the reference axis A. Depending on the application, the centerline axis C may be generally co-linear with the reference axis A or it may be offset in the transverse direction T, FIG. 1, with respect to the reference axis A. The heat spreading member 34 is positioned at a third elevation H3 above the mounting surface M of the support member 12. The third elevation H3 is approximately equal to the first elevation H1. The passage 36 has an overall height H4 approximately equal to the overall height H5 of the first heat dissipating body 20. In this configuration, the first heat dissipating body 20 is exposed to a substantial volume of the stream of air that flows through the passage 36.

A heat routing member 38, such as a commercially available heat pipe, is mounted between the spaced apart heat spreading members 32, 34 for conducting heat from the first heat spreading member 32 to the second heat spreading member 34. A first end 38a of the heat routing member 38 is mounted in an aperture 32a of the first heat spreading member 32. A second end 38b of the heat routing member 38 is mounted in an aperture 34a of the second heat spreading member 34. Although a single heat routing member 38 is illustrated, it is contemplated that a plurality of heat routing members 38 may be used.

It is desirable to position the first heat dissipating body 20 at a different elevation than the second heat dissipating body 26. By doing so, both of the heat dissipating bodies 20, 26 are exposed to substantially unheated portions of the stream of air supplied by the fan 17, FIG. 1. For example, in a configuration where the fan 17 draws air through the chassis 15, across the first and the second heat dissipating bodies 20, 26 and then out of the chassis 15, the first and the second heat dissipating bodies 20, 26 are both exposed to a substantially unheated stream of air because they are relatively offset in the stream of air. Similarly, in a configuration where the fan 17 draws air into the chassis 15 and the stream of air first flows through the passage 36 of the riser 30 and then over the first heat dissipating body 20, the portion of the stream of air that is directed over the first heat dissipating body 20 remains significantly unheated due to the above-mentioned offset.

FIG. 3 illustrates an embodiment of a riser 130 including a first heat spreading member 132, a second heat spreading member 134 spaced apart from the first heat spreading member 132 and a passage 136 extending therebetween. A plurality of cooling fins 127 are integrally attached to the riser 130 for enhancing heat dissipation from the riser 130. At least some of the cooling fins 127 are attached to the riser 130 within the passage 136.

FIG. 4 illustrates an embodiment of a riser 230 including a first heat spreading member 232, a second heat spreading member 234 spaced apart from the first heat spreading member 232 and a passage 236 extending therebetween. A heat routing member 238 is mounted between the first heat spreading member 232 and the second heat spreading member 234. A plurality of cooling fins 227 are attached to the heat routing member 238 for enhancing heat dissipation from the heat routing member 238.

An embodiment of a computer system 50 is illustrated in FIG. 5. The computer system 50 includes a plurality of microprocessors 52 mounted on a printed circuit substrate 53. As discussed above, the first heat dissipating device 18 is mounted on a first one of the microprocessors 52 and the second heat dissipating device 24 is mounted on a second one of the microprocessors 52. The microprocessors 52 are connected to a bus 54 that serves as a connection between the microprocessors 52 and other components of the computer system 50. One or more input devices 56 may be coupled to at least one of the microprocessors 52 to provide input to the microprocessors 52. Examples of input devices include keyboards, touchscreens, and pointing devices such as a mouse, a trackball and a trackpad. The computer system 50 may also include a display 58 which is coupled to at least one of the microprocessors 52 by a video controller 60. Programs and data are stored on a mass storage device 62 which is coupled to the microprocessors 52. Mass storage devices include components such as hard disks, optical disks, magneto-optical drives, floppy drives, and the like. A system memory 64 provides the microprocessors 52 with fast storage to facilitate execution of computer programs by the microprocessors 52. It should be understood that other busses and intermediate circuits can be employed between the components described above and microprocessors 52 to facilitate interconnection between the components and the microprocessors 52.

As a result, one embodiment provides an apparatus for cooling a plurality of heat generating devices including a support member and a plurality of heat dissipating devices attached to the support member. A first one of the heat dissipating devices includes a first heat dissipating body positioned at a first elevation above a mounting surface of the support member. A second one of the heat dissipating devices includes a second heat dissipating body positioned at a second elevation above the mounting surface of the support member.

Another embodiment provides a computer system including a chassis having a printed circuit substrate mounted thereon. A plurality of microprocessors are mounted on the printed circuit substrate. A first one of the microprocessors is mounted in an in-line configuration with respect to a second one of the microprocessors. A system memory is coupled to provide storage to facilitate execution of computer programs by the microprocessors. An input is coupled to provide input to at least one of the microprocessors and a display is coupled to the microprocessors by a video controller. A mass storage is coupled to at least one of the microprocessors. A heat dissipating device is mounted on each one of the microprocessors. The heat dissipating device mounted on the first one of the microprocessors includes a first heat dissipating body positioned at a first elevation above a mounting surface of the printed circuit substrate. The heat dissipating device mounted on the second one of the microprocessors includes a second heat dissipating body positioned at a second elevation above the mounting surface of the printed circuit substrate. A fan is mounted on the chassis adjacent to the printed circuit substrate for directing a stream of air over at least a portion of the first and the second heat dissipating bodies.

A further embodiment provides a heat dissipating device including a thermally conductive riser having a plurality of spaced apart heat spreading members and an air flow passage extending between a first one of the heat spreading members and a second one of heat spreading members. A heat routing member extends between the first and the second heat spreading members in the air flow passage. The heat routing member has a first end thereof attached to the first heat spreading member and a second end thereof attached to the second heat spreading member. A heat dissipating body is attached to the second heat dissipating member.

As it can be seen, the embodiments disclosed herein provide several advantages. Less space is required for cooling a plurality of heat generating devices. Each heat dissipating body is subjected to substantially unheated stream of air, improving cooling efficiency. The cooling reserve of heat dissipating devices mounted downstream of another heat dissipating body is substantially increased. Temperature variations between the plurality of heat generating devices are decreased. Conventional heat dissipating bodies may be used, providing a cost-effective cooling solution. A relatively small forced air device may be used.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An apparatus for cooling a plurality of heat generating devices, comprising:

a support member;

a plurality of heat dissipating devices attached to the support member, a first one of the heat dissipating devices including a first heat dissipating body positioned at a first elevation above a mounting surface of the support member and a second one of the heat dissipating devices including a second heat dissipating body positioned at a second elevation above the mounting surface of the support member; and wherein the second heat dissipating device includes a heat routing member extending between the support member and the second heat dissipating body.

2. The apparatus of claim 1 wherein the wherein the second heat dissipating device includes a riser mounted between the support member and the second heat dissipating body.

3. The apparatus of claim 2 wherein the riser includes a first heat spreading member, a second heat spreading member, and an air flow passage extending therebetween.

4. The apparatus of claim 3 wherein the second heat dissipating body is attached to the second heat spreading member of the riser.

5. The apparatus of claim 2 wherein a centerline axis of the air flow passage extends through the first heat dissipating body.

6. The apparatus of claim 5 wherein a reference axis extending through the first heat dissipating body is substantially parallel with the centerline axis of the air flow passage.

7. The apparatus of claim 3 wherein the riser includes an air flow passage extending therethrough in a direction generally parallel to the mounting surface of the support member.

8. The apparatus of claim 7, further comprising:

a plurality of cooling fins attached to the riser in the air flow passage.

9. The apparatus of claim 8 wherein the cooling fins and the riser are integral.

10. The apparatus of claim 7 wherein the second heat dissipating device includes a heat routing member extending through the air flow passage.

11. The apparatus of claim 10 wherein the heat routing member is attached at a first end thereof to the first heat spreading member of the riser and at a second end thereof to the second heat spreading member of the riser.

12. The apparatus of claim 10 wherein a first end of the heat routing member is mounted in an aperture in the first heat spreading member of the riser and a second end of the heat routing member is mounted in an aperture in the second heat spreading member of the riser.

13. The apparatus of claim 10 wherein the heat routing member is a heat pipe.

14. The apparatus of claim 10, further comprising:

a plurality of cooling fins attached to the heat routing member in the airflow passage.

15. The apparatus of claim 1 further comprising:

a first heat generating device mounted between the first heat dissipating device and the support member; and a second heat generating device mounted between the second heat dissipating device and the support member.

16. The apparatus of claim 15 wherein the support member is a printed circuit substrate and wherein the first and the second heat generating devices are semiconductor devices.

17. The apparatus of claim 16 wherein the semiconductor devices are microprocessors.

18. The apparatus of claim 1 further comprising:

a chassis having the support member mounted thereon, and a fan mounted on the chassis adjacent to the support member for directing a stream of air over the first and the second heat dissipating bodies, a first portion of the stream of air directed over the first heat dissipating body and a second portion of the stream of air directed over the second heat dissipating body.

19. A computer system, comprising:

a chassis;

a printed circuit substrate mounted on the chassis;

a plurality of microprocessors mounted on the printed circuit substrate, a first one of the microprocessors being mounted in an in-line configuration with respect to a second one of the microprocessors;

a system memory coupled to provide storage to facilitate execution of computer programs by the microprocessors;

an input coupled to provide input to at least one of the microprocessors;

a video controller coupled to at least one of the microprocessors;

a mass storage coupled to at least one of the microprocessors;

a heat dissipating device mounted on each one of the microprocessors, the heat dissipating device mounted on the first one of the microprocessors including a first heat dissipating body positioned at a first elevation above a mounting surface of the printed circuit substrate, and the heat dissipating device mounted on the second one of the microprocessors including a second heat dissipating body positioned at a second elevation above the mounting surface of the printed circuit substrate;

a fan mounted on the chassis adjacent to the printed circuit substrate for directing a stream of air over at least a portion of the first and the second heat dissipating bodies; and the second heat dissipating device including a heat routing member extending between the substrate and the second heat dissipating body.

* * * * *